United States Patent
Tan

(10) Patent No.: US 12,301,695 B2
(45) Date of Patent: May 13, 2025

(54) TRANSMITTER EQUALIZER TAP EXTRACTION

(71) Applicant: Tektronix, Inc., Beaverton, OR (US)

(72) Inventor: Kan Tan, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 109 days.

(21) Appl. No.: 18/141,438

(22) Filed: Apr. 30, 2023

(65) Prior Publication Data
US 2023/0370242 A1 Nov. 16, 2023

Related U.S. Application Data

(60) Provisional application No. 63/341,989, filed on May 13, 2022.

(51) Int. Cl.
*H04L 7/00* (2006.01)
*H04L 25/03* (2006.01)

(52) U.S. Cl.
CPC ...... *H04L 7/0058* (2013.01); *H04L 25/03038* (2013.01)

(58) Field of Classification Search
CPC .............. H04L 7/0058; H04L 25/03038
See application file for complete search history.

(56) References Cited

U.S. PATENT DOCUMENTS 4,483,009 A * 11/1984 Honda .............. H04L 25/03038
375/232
6,301,298 B1 * 10/2001 Kuntz .............. H04L 25/03038
375/321

\* cited by examiner

*Primary Examiner* — Vineeta S Panwalkar
(74) *Attorney, Agent, or Firm* — Miller Nash LLP; Andrew J. Harrington

(57) ABSTRACT

A test and measurement instrument has one or more input ports to connect the instrument to a device under test (DUT), one or more processors configured to execute code to cause the one or more processors to: receive an equalized waveform and an un-equalized waveform through the input port from the DUT, without any knowledge of a digital pattern that corresponds to the waveforms and without extracting the digital pattern from the waveforms, align the un-equalized waveform and the equalized waveform in time to produce an aligned un-equalized waveform and an aligned equalized waveform, and use the aligned equalized waveform and the aligned un-equalized waveform to determine equalizer tap values.

20 Claims, 12 Drawing Sheets

TRANSMITTER EQUALIZER TAP EXTRACTION

CROSS-REFERENCE TO RELATED APPLICATIONS

This disclosure claims benefit of U.S. Provisional Application No. 63/341,989, titled "TRANSMITTER EQUALIZER TAP EXTRACTION," filed on May 13, 2022, the disclosure of which is incorporated herein by reference in its entirety.

TECHNICAL FIELD

This disclosure relates to test and measurement systems, and more particularly to techniques for extracting transmitter equalizer tap values in digital communications systems.

BACKGROUND

In digital communication systems, when the signal speed increases, the equalizers in transmitters (Tx) and receivers (Rx) are widely used to improve the system performance. For example, as shown in Table 1, for generations of Peripheral Component Interconnect Express (PCIE) systems, the number of Tx Feed Forward Equalizer (FFE) taps increases from 3 in Gen5 (Generation 5) to 4 in Gen6 (Generation 6) as the transmission speed increases from 32GT/s to 64GT/s. In addition, the signal modulation scheme changes from NRZ (Non-Return-to-Zero) in the generations before Gen6 to PAM4 (Pulse Amplitude Modulation 4-Level) in Gen6.

TABLE 1

| PCIE Tx FFE | | | |
| --- | --- | --- | --- |
| | Transmission speed | Number of Tx FFE taps | Signal modulation |
| Gen5 | 32 GT/s | 3 | NRZ |
| Gen6 | 64 GT/s (32 GBaud) | 4 | PAM4 |

The PCIE Gen6 Tx FFE structure is shown in FIG. 1, with the main cursor tap $c_0$, one postcursor tap $c_{+1}$ and two precursor taps $c_{-1}$, $c_{-2}$.

FIG. 2 shows the impact of the Tx FFE on a pattern waveform. The FFE taps determine the four values: De-emphasis, Pre-Shoot 1, Pre-Shoot 2, Boost. These four values can be calculated if the pulse heights $V_a$, $V_b$, $V_{c1}$, $V_{c2}$, $V_d$ can be measured. The four Tx FFE taps can be derived from the calculated four values of De-emphasis, Pre-Shoot 1, Pre-Shoot 2, Boost. The four equations shown in FIG. 2 provides sufficient conditions to solve for the Tx FFE taps.

However, the high frequency nature of PCIE Gen6 signaling makes accurate measurement of single Unit Interval (UI) pulse heights impractical. As the signal reaches higher speed, the impairments such as the inter-symbol interference caused by higher insertion loss at higher frequencies could increase so much that the single UI pulses could not settle within the single UI, Therefore, the pulse height without impact of the impairments cannot be measured.

To avoid the limitation of the pulse height measurements, one could use the method shown in FIG. 3. An oscilloscope, or other test and measurement device captures the pattern waveforms from the transmitter devices under test (DUT), with and without transmitter equalizer turned on, the post-processing software operating in one or more processors extracts the step response waveforms with and without transmitter equalizer turned on. The transmitter can be set to have or not to have transmitter equalizer on. The transmitter equalizer taps can be obtained by the best fit that minimizes the mean squared error (MSE) between the measured equalized step response waveform and the reconstructed equalized step response waveform. The reconstructed equalized step response waveform is the transmitter equalizer applying on the step response waveform with transmitter equalizer turned off. Other variations of this method also use the mean squared error approach but may use the extracted pulse responses instead of using the extracted step responses. In either case, the system has the pattern information, or the system can extract the pattern information from the waveforms.

DETAILED DESCRIPTION

The embodiments here involve extraction of equalizer taps from incoming waveform data. The embodiments achieve this without knowledge of the digital pattern represented by the waveform and without using pattern detection. This alleviates any issues that may arise with attempts to detect patterns that suffer from significant impairments.

Figure 1:
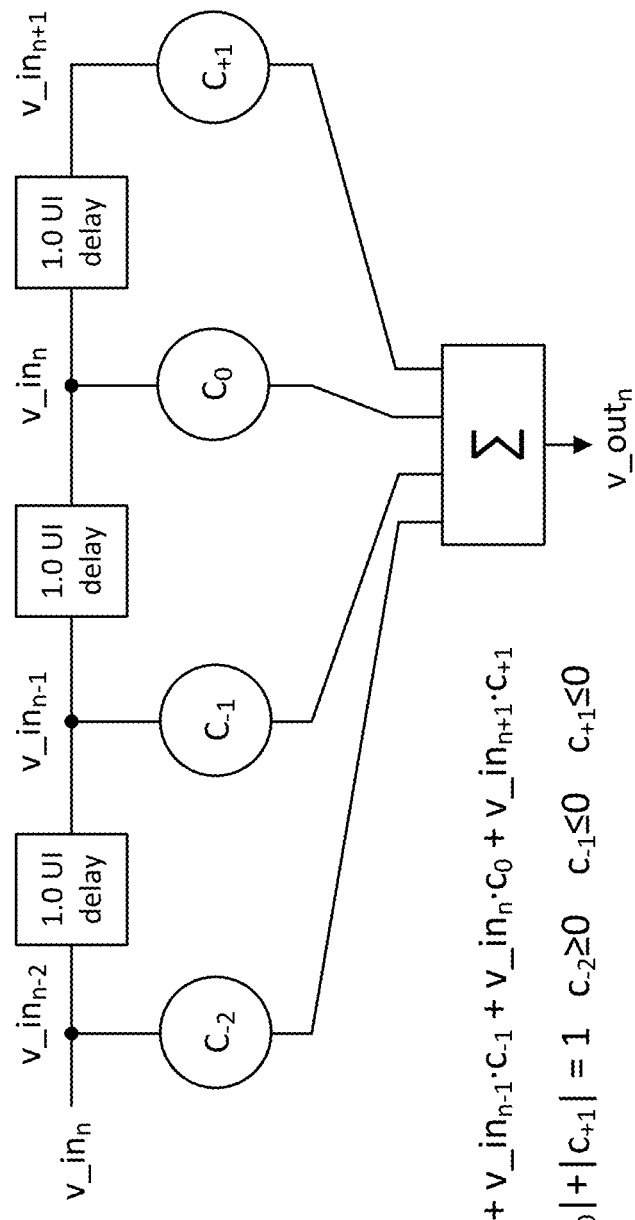
FIG. 1 shows a diagram of the PCIE Gen6 transmitter FFE structure.
Figure 2:
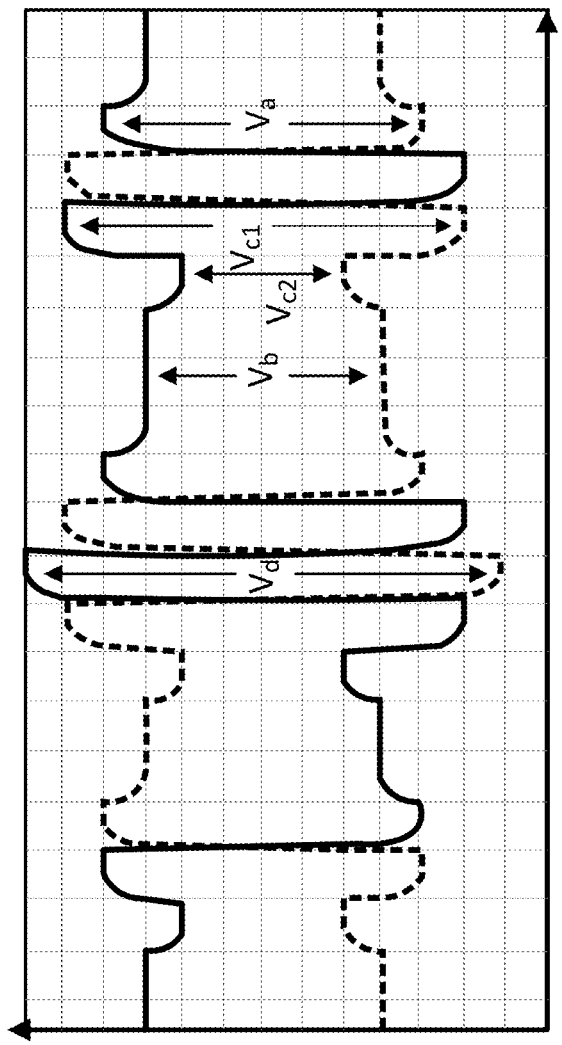
FIG. 2 shows a diagram of the impact of a transmitter FFE on a waveform.
Figure 3:
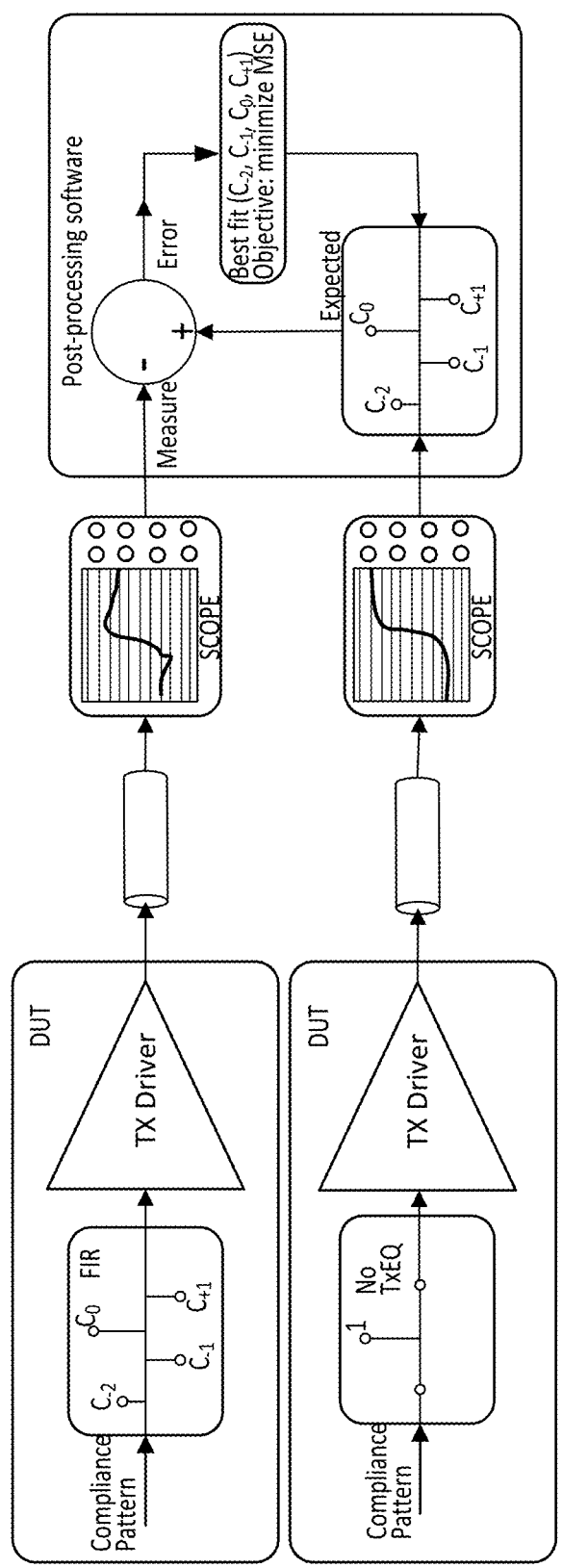
FIG. 3 shows a diagram of transmitter FFE measurements.
Figures 4, 5:
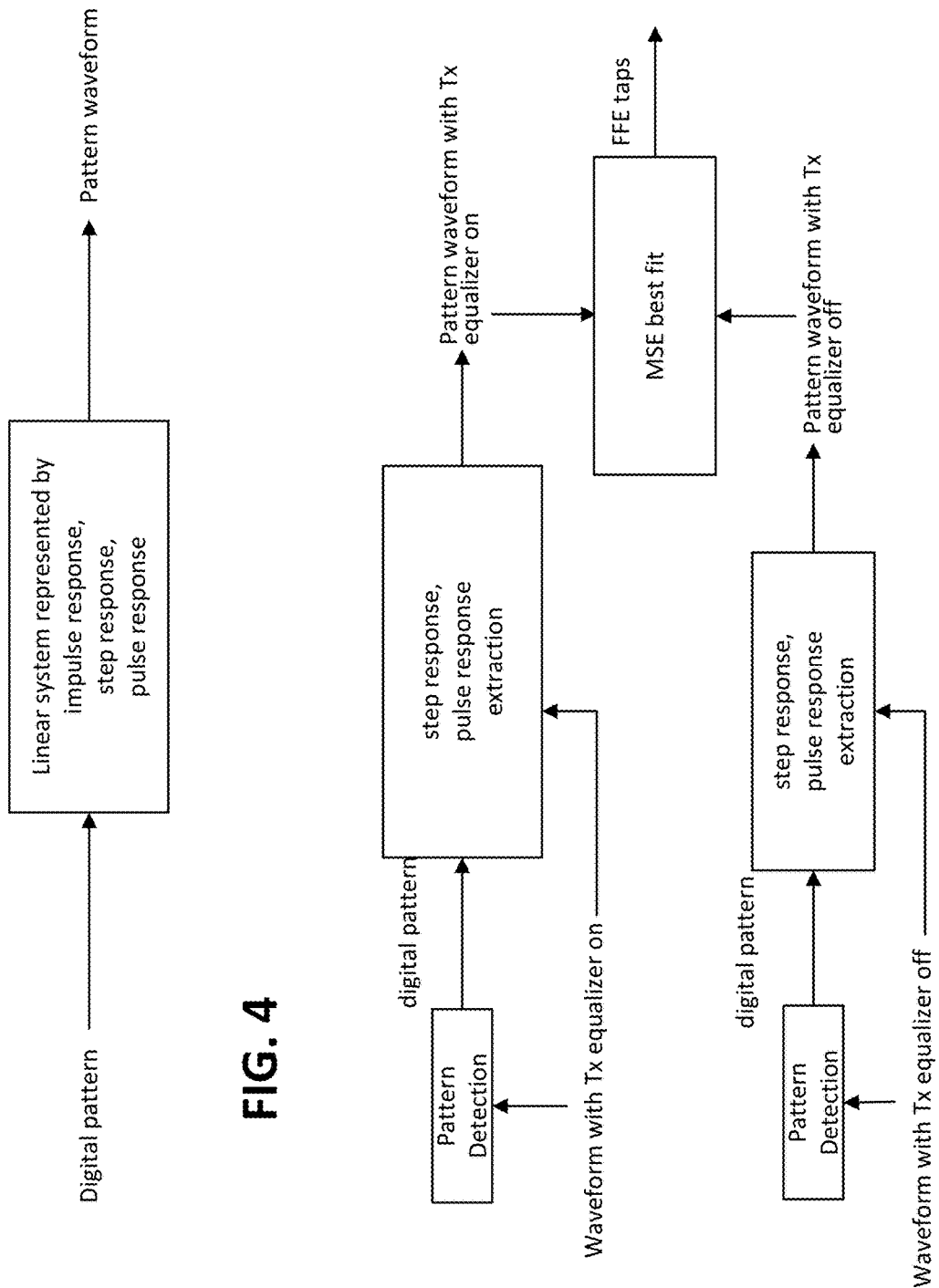
FIG. 4 shows a diagram of a linear system with a digital pattern input and a pattern waveform as output.
FIG. 5 shows diagrams of FFE extraction with pattern detection.

The methods described above rely on the knowledge of the digital pattern that corresponds to the pattern waveforms. The digital pattern could be a sequence of bit 0, 1 for NRZ signals and symbol 0, 1, 2, 3 for PAM4 signals. As shown in FIG. 4, the step response or pulse response can be extracted from the pattern waveform if the digital pattern is known. The middle block in FIG. 4 represents the linear system, which could be represented equivalently by an impulse response, a step response, or a pulse response.

If the digital pattern is unknown, then the process needs to detect the pattern from the pattern waveform. FIG. 5 shows an example of this workflow. However, when the measured pattern waveform has significant impairments, correct detection of the digital pattern may not be feasible. The error in the digital pattern detection impacts the accuracy of the step response or the pulse response extraction based on the detected digital pattern, resulting in less accurate transmitter equalizer tap values when extracting FFE taps based on the step response or the pulse response.

The embodiments here provide approaches that can extract the equalizer taps from a waveform without pattern detection When it is not feasible to accurately detect the digital pattern from waveforms, the approaches described can extract the taps without involving the pattern detection such as those shown in FIG. 5.

Figure 6:
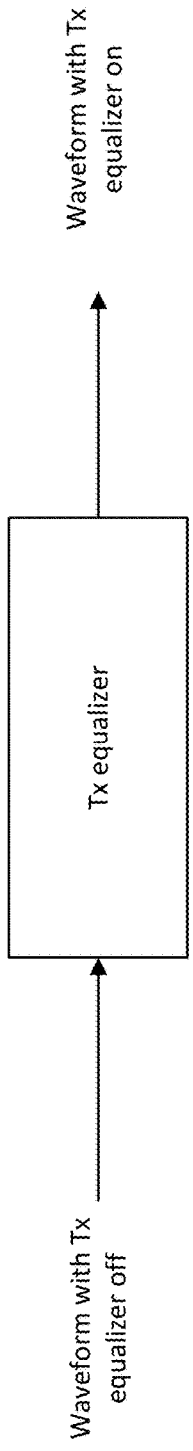
FIG. 6 shows a diagram of transmitter equalizer applied to an un-equalized waveform.

As shown in FIG. 6, the two waveforms acquired by the real-time scope or equivalent time sampling scope are related to each other by the transmitter equalizer.

Figure 7:
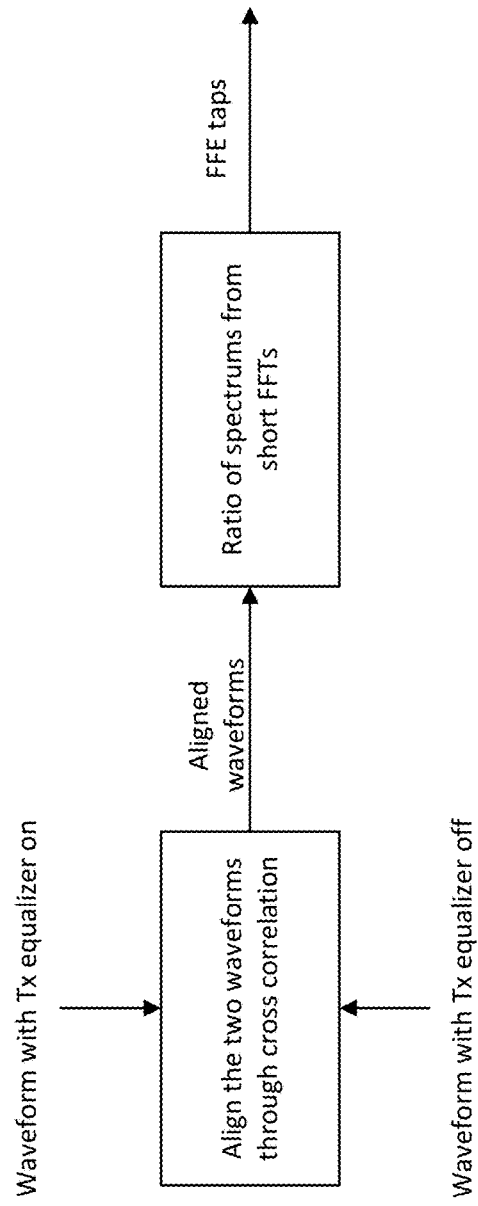
FIG. 7 shows an embodiment of the spectrum domain equalizer tap extraction without pattern knowledge.

The embodiments here can derive the frequency domain transfer function of the transmitter equalizer as the ratio between the equalized waveform spectrum and the un-equalized waveform spectrum. As shown in FIG. 7, the Tx FFE taps are extracted without knowing the digital pattern. FIG. 7 shows one approach to determine the FFE taps without knowledge of the digital pattern and no need to extract it as in previous approaches. This embodiment uses short Fast Fourier Transform (FFT) to analyze the spectrums of the two signals to extract the FFE taps.

An oscilloscope or other test and measurement instrument acquires the un-equalized waveform and equalized waveforms. The test and measurement instrument may comprise a real-time scope or equivalent sampling scope as examples. The instrument then re-samples the waveforms synchronous to the unit interval. For example, the resampling may have 32 or more samples per unit interval. This process may use one or both software and hardware clock recover.

Figure 8:
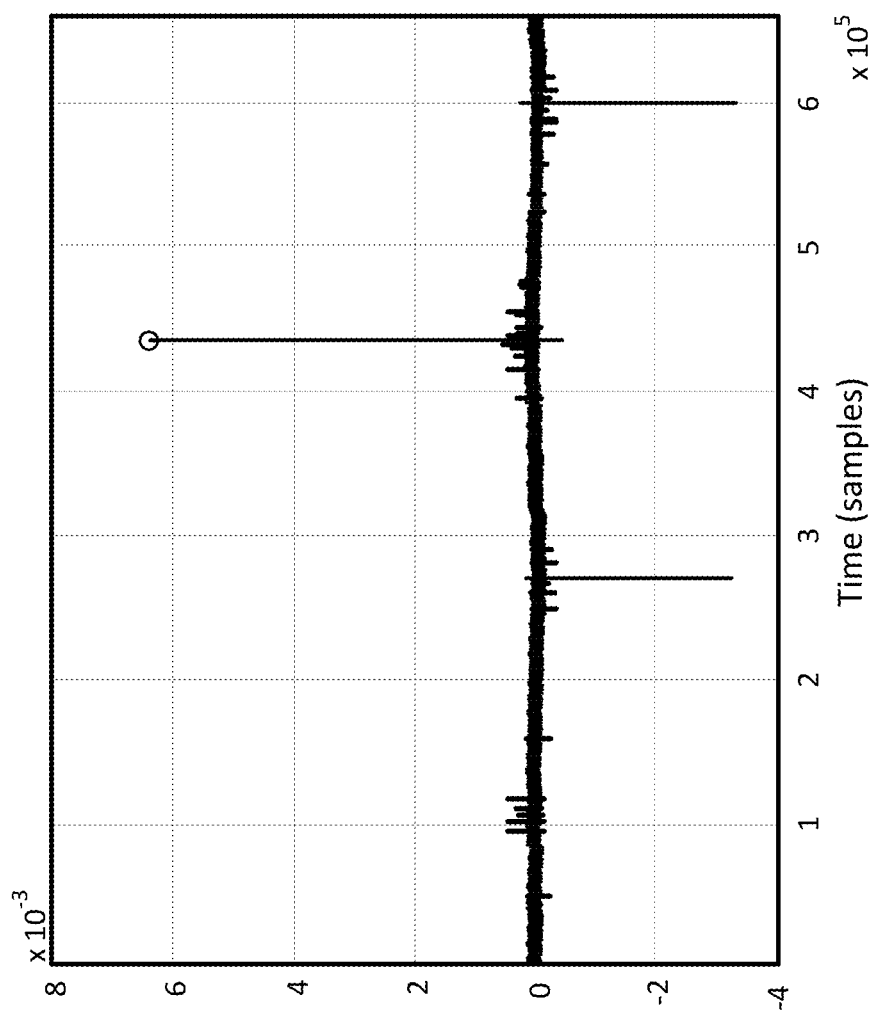
FIG. 8 shows a graph of cross correlation function between the two waveforms.
Figure 9:
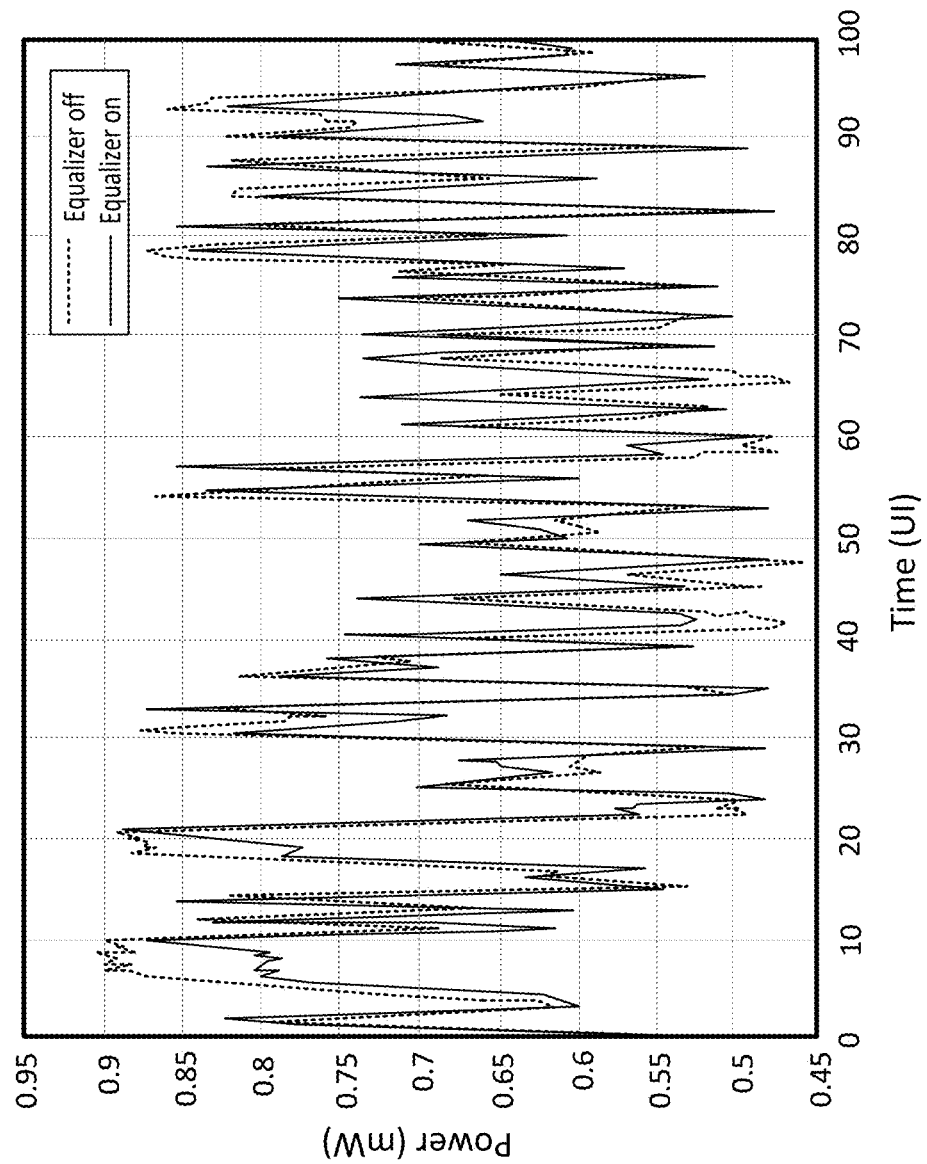
FIG. 9 shows a graph of aligned waveforms.

The process then runs cross correlation to align the two waveforms. FIG. 8 shows the cross-correlation function. The peak location identified by the circled point indicates the horizontal offset between the two waveforms. FIG. 9 shows a portion of the aligned waveforms are shown in FIG. 9. In the example the waveforms represent a pair of 53.125 GBaud PAM4 optical signals. The 53.125 GBaud rate is the symbol rate of the signal.

The process chooses a window size, for example, 40 UIs. The process steps through the pattern waveform, for each step, takes the mean value out, then applies the window function, for example, a Tukey window. The process then runs short FFT to get the waveform spectrums for the two waveforms.

Figure 10:
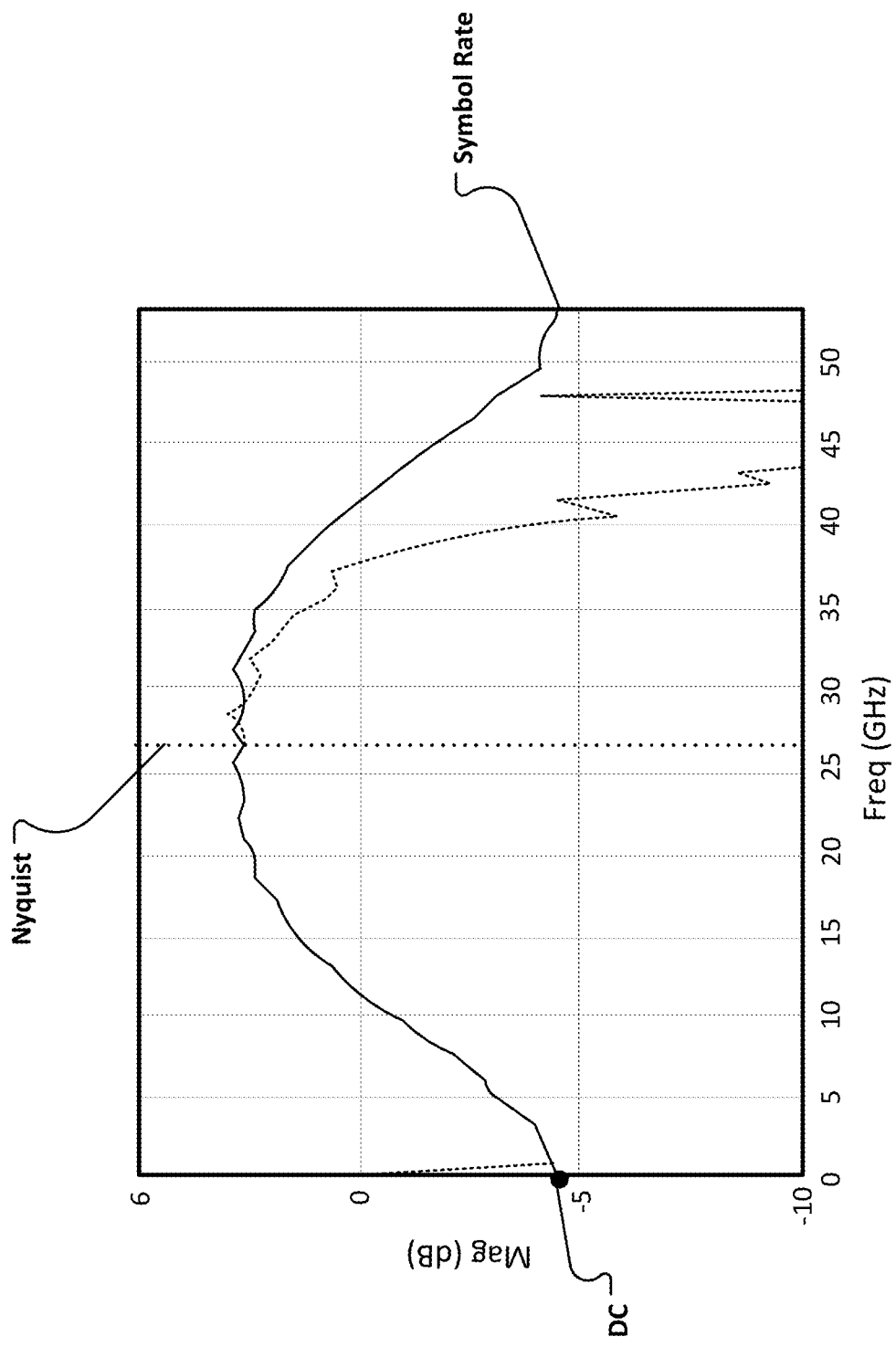
FIG. 10 shows a graph of a waveform expected ratio and a constructed spectrum ratio.

With the waveform spectrums, one can calculate the ratio of the equalized waveform spectrum and the un-equalized waveform spectrum. The process steps through the pattern waveform to calculate the spectrum ratio for each step, then takes the average of the spectrum ratios over all the steps. FIG. 10 shows the averaged spectrum ratio from the frequency equivalent of the DC frequency to the frequency at the symbol rate of 53.125 GHz.

The process then extrapolates a number of the initial low frequency points of the averaged spectrum ratio to get the revised DC value, as shown in FIG. 10 by the dot at DC. Low frequency as used here means the lower frequencies at the left of the graph. For transmitter having other controls that could yield a DC gain significantly deviating from FFE DC gain, the actual DC gain from the ratio of the two waveform spectrums can be considered separately.

With the revised value at DC, the process may reconstruct the spectrum ratio from 3 4conjugate as shown 7 nin FIG. 10. The frequency points from DC to $f_{symbol\ Rate}$ fully describe the56 bv bb frequency response of the transmitter equalizer. One embodiment may repeat the frequency response points from DC to the symbol rate over multiples of symbol rate. For example, 16 times symbol rate to get the frequency response of the transmitter equalizer at 32 samples per UI setting.

Second, the acquired waveforms have higher signal noise ratio from DC to $f_{Nyquist}$ than at frequencies higher than $f_{Nyquist}$ for NRZ, PAM4 and other high-speed signals in the digital communication systems. The reconstruction of the spectrum ratio may use the data points with higher signal noise ratio to generate the complete frequency response based on the observed symmetry. As shown in FIG. 10, the lower signal noise ratio at frequencies higher than $f_{Nyquist}$ yields less accurate representation of the transmitter equalizer frequency response beyond $f_{Nyquist}$ to the symbol rate frequency.

Figure 11:
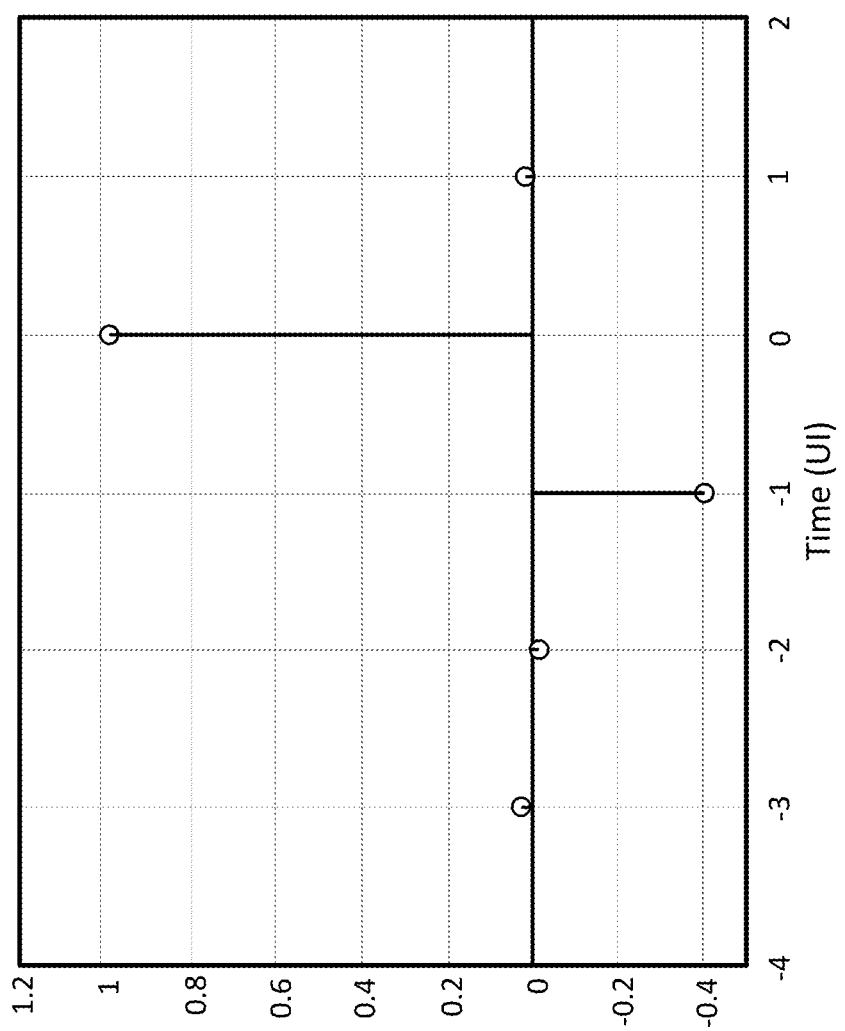
FIG. 11 shows a diagram of transmitter FFE taps extracted using one embodiment.

To acquire the time domain impulse response the process runs IFFT (inverse FFT) on the revised spectrum ratio to get the time domain impulse response. This allows extraction of the FFT tap values. FIG. 11 shows the values for a 5 tap FFE. The revision of the DC value and the reconstruction of the spectrum ratio contributes to the accuracy of this approach based upon some observations. First, the transmitter equalizer FFE is a discrete one UI spaced FIR filter, so it has a symmetrical frequency response, mirrored along the $f_{Nyquist}$ up to symbol rate, then repeated.

Prior conventional methods require the knowledge of the digital pattern. If the digital pattern is not available, it takes extra time to detect the pattern. The prior methods involve time domain step response or pulse extraction based on an MSE approach. In comparison, some embodiments do not detect or extract the pattern, possibly because there is no need to detect the pattern. These embodiments may also use FFT, resulting in the process running significantly faster that current approaches. For example, one example provided over 10× speed improvement.

Returning to FIG. 6, the un-equalized waveform and equalized waveform comprise the input and output of the linear system representing the transmitter equalizer. The output waveform is the result of the input waveform convolved with the FFE taps in time domain. The FFE tap extraction can be achieved by best fit that minimizes the MSE for the convolution relationship. The approach does not involve the digital pattern as in the prior approach shown in FIG. 5.

Figure 12:
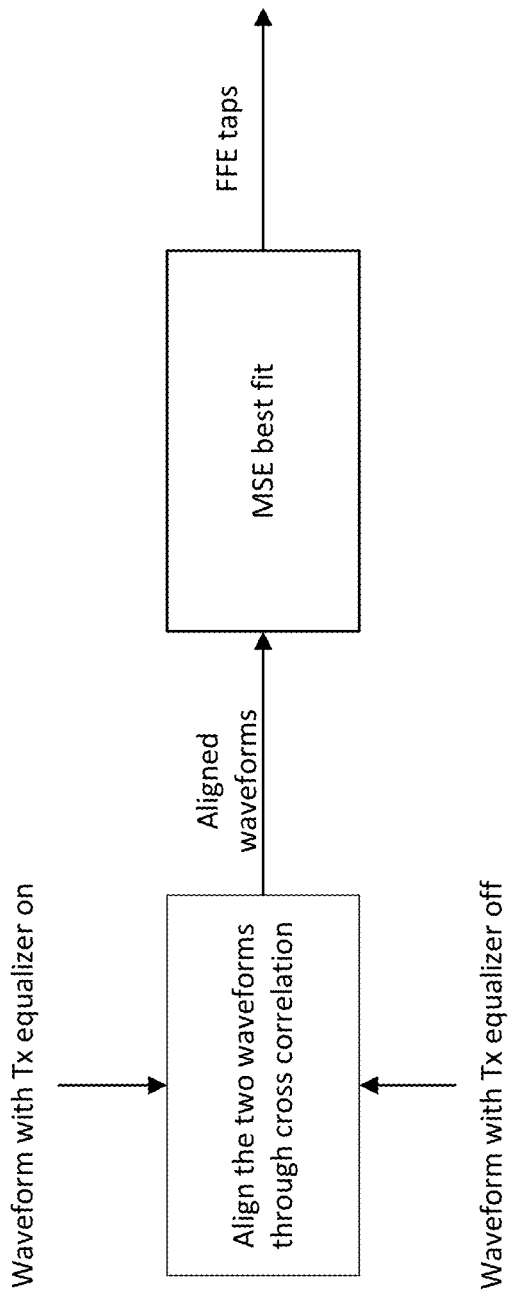
FIG. 12 shows a transmitter FFE taps extracted using another embodiment.

FIG. 12 shows an embodiment of this process. This embodiment uses the same acquisition, re-sampling, and cross-correlation processes as in the previous embodiment. Using the aligned waveforms, the process constructs matrices to represent the convolution discussed above. The process finds the offset that minimizes the mean squared error (MSE). As discussed above, this process differs from the prior linear fit process because the prior linear fit process uses the digital pattern. These embodiments do not use the digital pattern, it uses the un-equalized waveform and the equalized waveform. The process then determines the tap values corresponding to the offset that minimizes the MSE.

The matrix equation looks like Ax=b, where A and b are constructed from the pair of waveforms. The x represents the FFE taps. The minimizing "mean squared error" solution to the matrix equation is x=(A'×A)\(A'×b).

Figure 13:
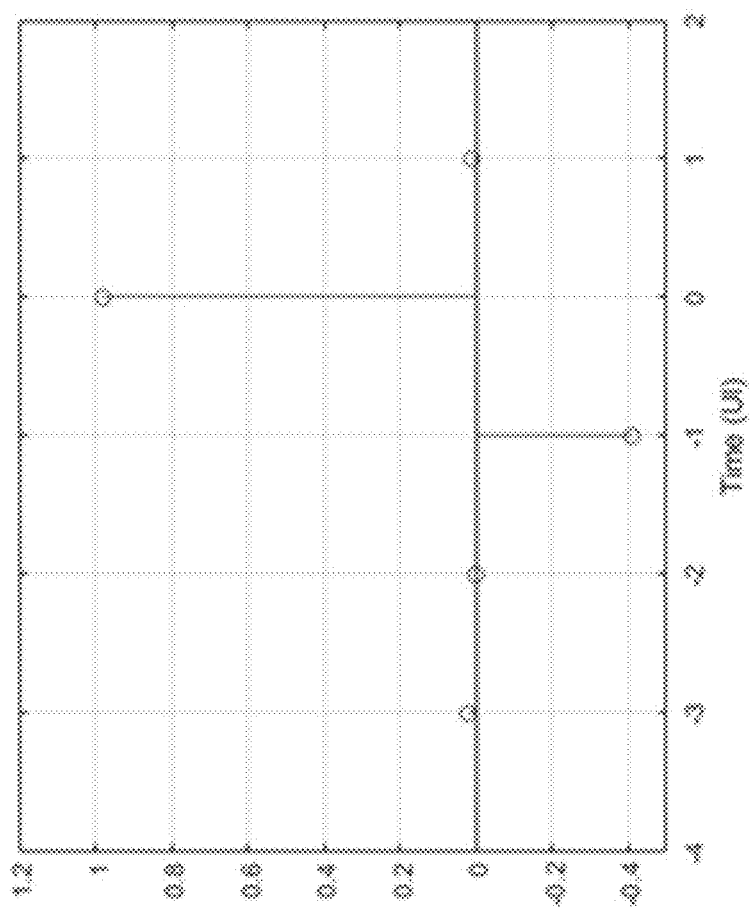
FIG. 13 shows a diagram of transmitter FFE taps extracted using another embodiment.

For the same waveforms used to extract the Tx FFE tap, this approach yields taps as shown in FIG. 13.

The taps shown in FIG. 13 from the MSE best fit approach match the taps shown in FIG. 11 from the short FFT based approach. The following table shows that the tap values from these two approaches (labelled as "FFT" and "MSE" respectively) match the tap values obtained based on the linear fit pulse (labelled as "LFP"). The linear fit pulse approach depends on the digital pattern been detectable or been known.

TABLE 1

| | Extracted FFE taps | | | | |
|---|---|---|---|---|---|
| Method | | Tx EFE taps | | | |
| "FFT" | 0.028291 | −0.0092698 | −0.38826 | 9.98923 | −0.0036664 |
| "MSE" | 0.020851 | 1.8157e-05 | −0.40804 | 0.8802 | 0.01052 |
| "LFF" | 0.023067 | 0.0018205 | −0.41599 | 0.99095 | 0.0079364 |

The embodiments describe two embodiments of an approach that extracts Tx FFE taps without involving the digital pattern, whether known or capable of being extracted. One approach is based on short FFT, the other approach is based on best fit that minimizes MSE. When the digital pattern is unknown and the pattern detection is not feasible because of significant impairments in the signals, the embodiments can get accurate values of the Tx FFE taps since they operate on the two waveforms directly without involving the digital pattern, as shown in FIG. 7 and FIG. 12, in comparison with FIG. 5.

Figure 14:
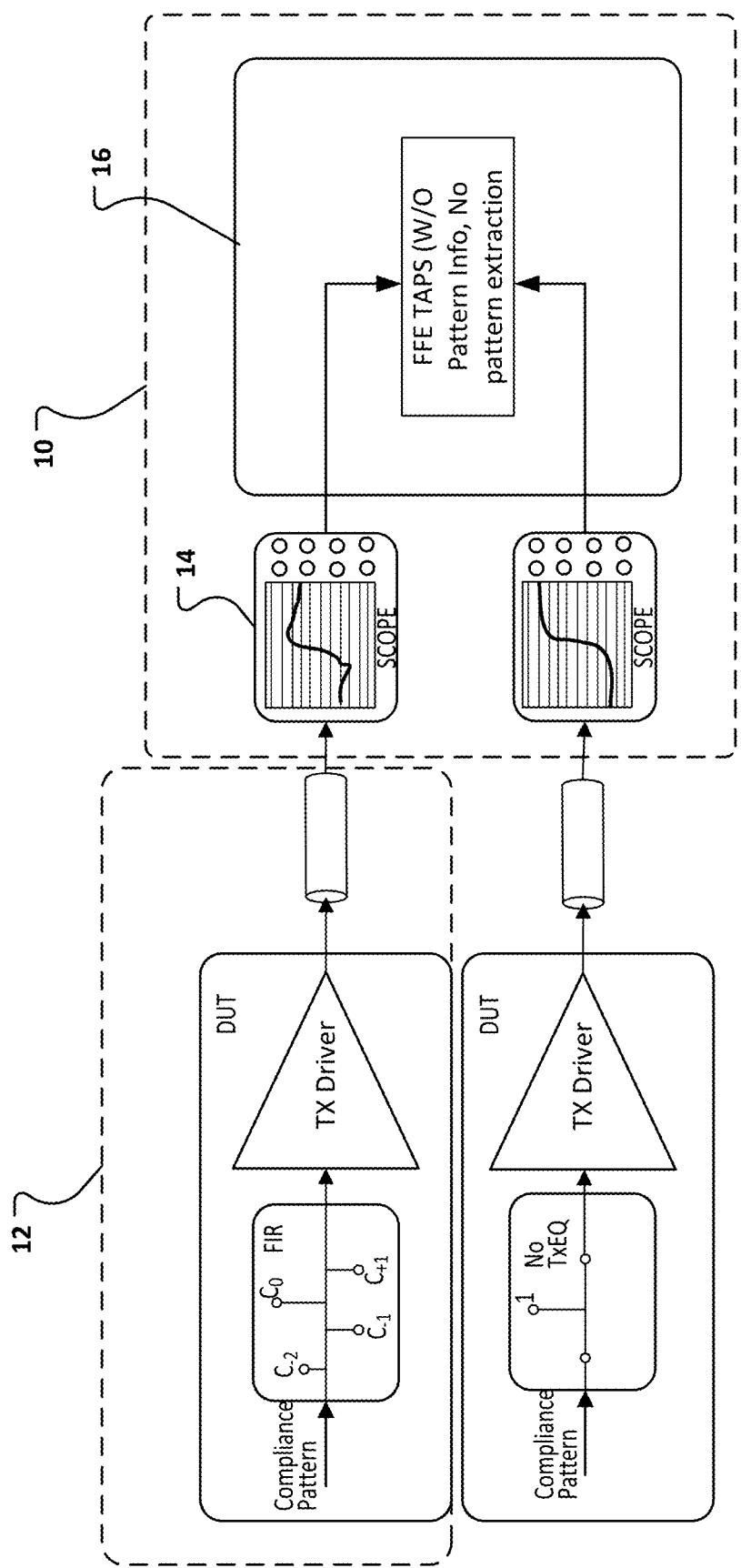
FIG. 14 shows an embodiment of a test and measurement instrument.

As previously discussed, an oscilloscope, or other test and measurement device captures the pattern waveforms from the transmitter devices under test (DUT), with and without transmitter equalizer. FIG. 14 shows a test and measurement instrument, such as an oscilloscope 10, that receives signals at input ports such as 14, from a transmitter as part of a device under test (DUT) 12. The input ports 14 may comprise one or more input ports. Differential signals have two legs of signals, represented a pair of signals, the positive leg signal, and the negative leg signal. For most high-speed serial data links, the signals are differential. The embodiments here for Tx FFE applies to both single-ended and differential signals. For differential signals, the two signals are acquired and then undergo differential operations where signal_diff=signal_positive−signal_negative. One or more processors, such as 16, in the instrument operates on the un-equalized waveform and the equalized waveform, without knowledge of the digital pattern represented by the waveforms, without the need to extract the pattern from the waveforms and extracts the FFE taps from the DUTs.

One should note that the extraction of the equalizer taps here focuses on FFE taps based upon the IEEE and PCIE standards, but the instrument and the methods disclosed here may apply to other standards, other signaling, and other equalizers.

Aspects of the disclosure may operate on a particularly created hardware, on firmware, digital signal processors, or on a specially programmed general-purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Program modules include routines, programs, objects, components, data structures, etc., that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable, or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description refers to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

The previously described versions of the disclosed subject matter have many advantages that were either described or would be apparent to a person of ordinary skill. Even so, these advantages or features are not required in all versions of the disclosed apparatus, systems, or methods.

EXAMPLES

Illustrative examples of the disclosed technologies are provided below. An embodiment of the technologies may include one or more, and any combination of, the examples described below.

Example 1 is a test and measurement instrument comprising: one or more input ports to connect the instrument to a device under test (DUT); one or more processors configured to execute code to cause the one or more processors to: receive an equalized waveform and an un-equalized waveform through the input port from the DUT, without any knowledge of a digital pattern that corresponds to the waveforms and without extracting the digital pattern from the waveforms; align the un-equalized waveform and the equalized waveform in time to produce an aligned un-equalized waveform and an aligned equalized waveform; and use the aligned equalized waveform and the aligned un-equalized waveform to determine equalizer tap values.

Example 2 is the instrument of Example 1, wherein the code to cause the one or more processors to align the un-equalized and equalized waveforms causes the one or more processors to: resample the un-equalized waveform and the equalized waveform synchronous to a unit interval to produce a resampled un-equalized waveform and a resampled equalized waveform; cross-correlate the resampled un-equalized waveform and the resampled equalized waveform to determine a horizontal offset; and use the horizontal offset to produce the aligned un-equalized waveform and the aligned equalized waveform.

Example 3 is the instrument of either Examples 1 or 2, wherein the code that causes the one or more processors to use the aligned un-equalized waveform and the aligned equalized waveforms to determine equalizer tap values further comprises code to cause the one or more processors to: convert the aligned un-equalized waveform and the aligned equalized waveform to spectrums to produce an un-equalized waveform spectrum and an equalized waveform spectrum; find an average spectrum ratio of the un-equalized waveform spectrum to the equalized waveform spectrum; revise the average spectrum ratio in a range from the Nyquist frequency to a symbol rate frequency to produce a revised spectrum; convert the revised spectrum using an Inverse Fast Fourier Transform to the time domain to produce a time domain impulse response; and extract the equalizer tap values from the time domain impulse response.

Example 4 is the instrument of Example 3, wherein the code to cause the one or more processors to convert the aligned un-equalized waveform and the aligned equalized waveform further comprises code to cause the one or more processors to: choose a window size in a number in unit intervals; step through the aligned un-equalized waveform and the aligned equalized waveform and remove a mean value for each step; apply a window function; and perform a short Fast Fourier Transform to acquire the spectrums for the un-equalized waveform and the equalized waveform.

Example 5 is the instrument of Example 3, wherein the code that causes the one or more processors to find the average spectrum ratio comprises code to cause the one or more processors to: calculate a spectrum ratio of the equalized waveform spectrum to the un-equalized waveform spectrum; step through the waveforms to calculate the spectrum ratio for each step; and find the average of the spectrum ratio over all the steps to produce the average spectrum ratio.

Example 6 is the instrument of Example 3, wherein the code to cause the one or more processors to revise the spectrum ratio comprises code to cause the one or more processors to determine a revised DC value based upon a number of initial low frequency points and reconstruct the spectrum ratio from the Nyquist frequency to the symbol rate frequency.

Example 7 is the instrument of Example 6, wherein the one or more processors are further configured to execute code to cause the one or more processors to repeat frequency response points in a frequency range from DC to the symbol rate over multiples of the symbol rate.

Example 8 is the instrument of Example 6, wherein the code to cause the one or more processors to reconstruct the spectrum ratio comprises code to cause the one or more processors to use data points with a higher signal to noise ratio between DC and the Nyquist frequency to replace lower signal to noise data points between the Nyquist.

Example 9 is the instrument of Example 6, wherein the code to cause the one or more processors to reconstruct the spectrum ratio comprises code to cause the one or more processors to mirror the ratio between DC and the Nyquist frequency to construct the ratio between the Nyquist frequency to a symbol rate frequency.

Example 10 is the instrument of any of Examples 1 through 9, wherein the code to cause the one or more processors to use the aligned equalized waveform and the aligned un-equalized waveform to determine equalizer tap values comprises code to cause the one or more processors to: construct a matrix equation to represent a convolution of the un-equalized waveform with the equalizer tap values that produce the equalized waveform; and calculate the equalizer tap values by finding a solution to the matrix equation that minimizes the mean squared error.

Example 11 is a method of determining equalizer tap values comprising: receiving an equalized waveform and an un-equalized waveform through one or more input ports from a decide under test (DUT), without any knowledge of a digital pattern that corresponds to the waveforms and without extracting the digital pattern from the waveforms; aligning the un-equalized waveform and the equalized waveform in time to produce an aligned un-equalized waveform and an aligned equalized waveform; and using the aligned equalized waveform and the aligned un-equalized waveform to determine equalizer tap values.

Example 12 is the method of Example 11, wherein aligning the un-equalized and equalized waveforms comprises: resampling the un-equalized waveform and the equalized waveform synchronous to a unit interval to produce a resampled un-equalized waveform and a resampled equalized waveform; cross-correlating the resampled un-equalized waveform and the resampled equalized waveform to determine a horizontal offset; and using the horizontal offset to produce the aligned un-equalized waveform and the aligned equalized waveform.

Example 13 is the method of either of Examples 11 or 12, wherein using the aligned un-equalized waveform and the aligned equalized waveforms to determine tap values further comprises: converting the aligned un-equalized waveform and the aligned equalized waveform to spectrums to produce an un-equalized waveform spectrum and an equalized waveform spectrum; finding an average spectrum ratio of the un-equalized waveform spectrum to the equalized waveform spectrum; revising the average spectrum ratio in a range from the Nyquist frequency to a symbol rate frequency to produce a revised spectrum; converting the revised spectrum using an Inverse Fast Fourier Transform to the time domain to produce a time domain impulse response; and extracting the equalizer tap values from the time domain impulse response.

Example 14 is the method of Example 13, wherein converting the aligned un-equalized waveform and the aligned equalized waveform further comprises: choosing a window size in a number in unit intervals; stepping through the aligned waveforms and remove a mean value for each step; applying a window function; and performing a short Fast Fourier Transform to acquire the spectrums for the un-equalized waveform and the equalized waveform.

Example 15 is the method of Example 13, wherein finding the average spectrum ratio comprises: calculating a spectrum ratio of the equalized waveform spectrum to the un-equalized waveform spectrum; stepping through the waveforms to calculate the spectrum ratio for each step; and finding the average of the spectrum ratio over all the steps.

Example 16 is the method of Example 13, wherein revising the spectrum ratio comprises determining a revised DC value based upon a number of initial low frequency points and reconstructing the spectrum ratio from the Nyquist frequency to the symbol rate frequency.

Example 17 is the method of Example 16, further comprising repeating frequency response points in a frequency range from DC to the symbol rate over multiples of the symbol rate.

Example 18 is the method of Example 16, wherein reconstructing the spectrum ratio comprises using data points with a higher signal to noise ratio between DC and the Nyquist frequency to replace lower signal to noise data points between the Nyquist frequency to the symbol rate frequency.

Example 19 is the method of Example 16, wherein revising the spectrum ratio comprises mirroring the ratio between DC and the Nyquist frequency to construct the ratio between the Nyquist frequency and the symbol rate frequency.

Example 20 is the method of any of Examples 11 through 19, wherein using the aligned equalized waveform and the aligned un-equalized waveform to determine equalizer tap values comprises: constructing a matrix of values to represent a convolution of the un-equalized waveform with the equalizer tap values that produce the equalized waveform; and calculating the equalizer tap values by finding a solution to the matrix equation that minimizes the mean squared error.

Although specific examples of the invention have been illustrated and described for purposes of illustration, it will be understood that various modifications may be made without departing from the spirit and scope of the invention. Accordingly, the invention should not be limited except as by the appended claims.

We claim:

1. A test and measurement instrument, comprising:
one or more input ports to connect the instrument to a device under test (DUT);
one or more processors configured to execute code to cause the one or more processors to:
receive an equalized waveform and an un-equalized waveform through the input port from the DUT, without any knowledge of a digital pattern that corresponds to the waveforms and without extracting the digital pattern from the waveforms;
align the un-equalized waveform and the equalized waveform in time to produce an aligned un-equalized waveform and an aligned equalized waveform; and
use the aligned equalized waveform and the aligned un-equalized waveform to determine equalizer tap values.

2. The instrument as claimed in claim 1, wherein the code to cause the one or more processors to align the un-equalized and equalized waveforms causes the one or more processors to:
resample the un-equalized waveform and the equalized waveform synchronous to a unit interval to produce a resampled un-equalized waveform and a resampled equalized waveform;
cross-correlate the resampled un-equalized waveform and the resampled equalized waveform to determine a horizontal offset; and
use the horizontal offset to produce the aligned un-equalized waveform and the aligned equalized waveform.

3. The instrument as claimed in claim 1, wherein the code to cause the one or more processors to use the aligned un-equalized waveform and the aligned equalized waveforms to determine equalizer tap values further comprises code to cause the one or more processors to:
convert the aligned un-equalized waveform and the aligned equalized waveform to spectrums to produce an un-equalized waveform spectrum and an equalized waveform spectrum;
find an average spectrum ratio of the un-equalized waveform spectrum to the equalized waveform spectrum;
revise the average spectrum ratio in a range from the Nyquist frequency to a symbol rate frequency to produce a revised spectrum;
convert the revised spectrum using an Inverse Fast Fourier Transform to the time domain to produce a time domain impulse response; and
extract the equalizer tap values from the time domain impulse response.

4. The instrument as claimed in claim 3, wherein the code to cause the one or more processors to convert the aligned un-equalized waveform and the aligned equalized waveform further comprises code to cause the one or more processors to:
choose a window size in a number in unit intervals;
step through the aligned un-equalized waveform and the aligned equalized waveform and remove a mean value for each step;
apply a window function; and
perform a short Fast Fourier Transform to acquire the spectrums for the un-equalized waveform and the equalized waveform.

5. The instrument as claimed in claim 3, wherein the code to cause the one or more processors to find the average spectrum ratio comprises code to cause the one or more processors to:
calculate a spectrum ratio of the equalized waveform spectrum to the un-equalized waveform spectrum;
step through the waveforms to calculate the spectrum ratio for each step; and
find the average of the spectrum ratio over all the steps to produce the average spectrum ratio.

6. The instrument as claimed in claim 3, wherein the code to cause the one or more processors to revise the spectrum ratio comprises code to cause the one or more processors to determine a revised DC value based upon a number of initial low frequency points and reconstruct the spectrum ratio from the Nyquist frequency to the symbol rate frequency.

7. The instrument as claimed in claim 6, wherein the one or more processors are further configured to execute code to cause the one or more processors to repeat frequency response points in a frequency range from DC to the symbol rate over multiples of the symbol rate.

8. The instrument as claimed in claim 6, wherein the code to cause the one or more processors to reconstruct the spectrum ratio comprises code to cause the one or more processors to use data points with a higher signal to noise ratio between DC and the Nyquist frequency to replace lower signal to noise data points between the Nyquist frequency to the symbol rate frequency.

9. The instrument as claimed in claim 6, wherein the code to cause the one or more processors to reconstruct the spectrum ratio comprises code to cause the one or more processors to mirror the ratio between DC and the Nyquist frequency to construct the ratio between the Nyquist frequency to a symbol rate frequency.

10. The instrument as claimed in claim 1, wherein the code to cause the one or more processors to use the aligned equalized waveform and the aligned un-equalized waveform to determine equalizer tap values comprises code to cause the one or more processors to:
    construct a matrix equation to represent a convolution of the un-equalized waveform with the equalizer tap values that produce the equalized waveform; and
    calculate the equalizer tap values by finding a solution to the matrix equation that minimizes the mean squared error.

11. A method of determining equalizer tap values, comprising:
    receiving an equalized waveform and an un-equalized waveform through one or more input ports from a device under test (DUT), without any knowledge of a digital pattern that corresponds to the waveforms and without extracting the digital pattern from the waveforms;
    aligning the un-equalized waveform and the equalized waveform in time to produce an aligned un-equalized waveform and an aligned equalized waveform; and
    using the aligned equalized waveform and the aligned un-equalized waveform to determine equalizer tap values.

12. The method as claimed in claim 11, wherein aligning the un-equalized and equalized waveforms comprises:
    resampling the un-equalized waveform and the equalized waveform synchronous to a unit interval to produce a resampled un-equalized waveform and a resampled equalized waveform;
    cross-correlating the resampled un-equalized waveform and the resampled equalized waveform to determine a horizontal offset; and
    using the horizontal offset to produce the aligned un-equalized waveform and the aligned equalized waveform.

13. The method as claimed in claim 11, wherein using the aligned un-equalized waveform and the aligned equalized waveforms to determine tap values further comprises:
    converting the aligned un-equalized waveform and the aligned equalized waveform to spectrums to produce an un-equalized waveform spectrum and an equalized waveform spectrum;
    finding an average spectrum ratio of the un-equalized waveform spectrum to the equalized waveform spectrum;
    revising the average spectrum ratio in a range from the Nyquist frequency to a symbol rate frequency to produce a revised spectrum;
    converting the revised spectrum using an Inverse Fast Fourier Transform to the time domain to produce a time domain impulse response; and
    extracting the equalizer tap values from the time domain impulse response.

14. The method as claimed in claim 13, wherein converting the aligned un-equalized waveform and the aligned equalized waveform further comprises:
    choosing a window size in a number in unit intervals;
    stepping through the aligned waveforms and remove a mean value for each step;
    applying a window function; and
    performing a short Fast Fourier Transform to acquire the spectrums for the un-equalized waveform and the equalized waveform.

15. The method as claimed in claim 13, wherein finding the average spectrum ratio comprises:
    calculating a spectrum ratio of the equalized waveform spectrum to the un-equalized waveform spectrum;
    stepping through the waveforms to calculate the spectrum ratio for each step; and
    finding the average of the spectrum ratio over all the steps.

16. The method as claimed in claim 13, wherein revising the spectrum ratio comprises determining a revised DC value based upon a number of initial low frequency points and reconstructing the spectrum ratio from the Nyquist frequency to the symbol rate frequency.

17. The method as claimed in claim 16, further comprising repeating frequency response points in a frequency range from DC to the symbol rate over multiples of the symbol rate.

18. The method as claimed in claim 16, wherein reconstructing the spectrum ratio comprises using data points with a higher signal to noise ratio between DC and the Nyquist frequency to replace lower signal to noise data points between the Nyquist frequency to the symbol rate frequency.

19. The method as claimed in claim 16, wherein revising the spectrum ratio comprises mirroring the ratio between DC and the Nyquist frequency to construct the ratio between the Nyquist frequency and the symbol rate frequency.

20. The method as claimed in claim 11, wherein using the aligned equalized waveform and the aligned un-equalized waveform to determine equalizer tap values comprises:
    constructing a matrix of values to represent a convolution of the un-equalized waveform with the equalizer tap values that produce the equalized waveform; and
    calculating the equalizer tap values by finding a solution to the matrix equation that minimizes the mean squared error.

* * * * *